US012367849B2

(12) United States Patent
Zhang et al.

(10) Patent No.: US 12,367,849 B2
(45) Date of Patent: Jul. 22, 2025

(54) LIQUID CRYSTAL DISPLAY (LCD) DRIVING CIRCUIT COMPENSATING GRAY-SCALE LOSS DUE TO ATTENUATION OF COMMON VOLTAGE

(71) Applicant: HKC Corporation Limited, Guangdong (CN)

(72) Inventors: Yuanping Zhang, Guangdong (CN); Mancheng Zhou, Guangdong (CN); Haijiang Yuan, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/645,016

(22) Filed: Apr. 24, 2024

(65) Prior Publication Data

US 2024/0363087 A1 Oct. 31, 2024

(30) Foreign Application Priority Data

Apr. 26, 2023 (CN) ........................ 202310463117.2

(51) Int. Cl.
*G09G 3/36* (2006.01)

(52) U.S. Cl.
CPC ... *G09G 3/3696* (2013.01); *G09G 2300/0842* (2013.01); *G09G 2310/061* (2013.01);
(Continued)

(58) Field of Classification Search
CPC ...... G09G 3/36; G09G 3/3611; G09G 3/3614; G09G 3/3622; G09G 3/3625; G09G 3/364;
(Continued)

(56) References Cited

U.S. PATENT DOCUMENTS

2002/0024484 A1* 2/2002 Lee ...................... G09G 3/3655 345/87
2002/0063703 A1* 5/2002 Furuhashi ............ G09G 3/3696 345/212

(Continued)

FOREIGN PATENT DOCUMENTS

CN 103413531 A 11/2013
CN 103761949 A 4/2014

(Continued)

OTHER PUBLICATIONS

First Office Action dated Jun. 2, 2023 received in Chinese Patent Application No. CN 202310463117.2.

*Primary Examiner* — Ke Xiao
*Assistant Examiner* — Nelson Lam
(74) *Attorney, Agent, or Firm* — Scully, Scott, Murphy & Presser, P.C.

(57) ABSTRACT

A driving circuit for a display panel, a display device, and a driving method are provided. The driving circuit includes a common voltage feedback line and N common voltage detection units. The N common voltage detection units are electrically connected to N common voltage collection points of a common electrode of the display panel in one-to-one correspondence. Each common voltage detection unit includes a switch module and a logic circuit. The switch module has a first connection end electrically connected to a common voltage collection point corresponding to the common voltage detection unit and a second connection end is electrically connected to the common voltage feedback line. N logic circuits sequentially output control signals to corresponding switch modules, and control N switch modules to sequentially turn on, to make the N common voltage collection points sequentially output N common voltages (Continued)

through the turned-on switch modules and common voltage feedback line.

20 Claims, 5 Drawing Sheets

(52) U.S. Cl.
CPC . *G09G 2310/08* (2013.01); *G09G 2320/0233* (2013.01); *G09G 2320/0271* (2013.01)

(58) Field of Classification Search
CPC .. G09G 3/3644; G09G 3/3648; G09G 3/3655; G09G 3/3658; G09G 3/3674; G09G 3/3677; G09G 3/3681; G09G 3/3685; G09G 3/3688; G09G 3/3692; G09G 3/3696
USPC .................................................... 345/87–104
See application file for complete search history.

(56) References Cited

U.S. PATENT DOCUMENTS

2006/0145995 A1* 7/2006 Kim .................... G09G 3/3655 345/98
2007/0024565 A1* 2/2007 Choi .................... G09G 3/3655 345/98
2009/0135124 A1* 5/2009 Nakatsuka ........... G09G 3/3655 345/94
2011/0164022 A1* 7/2011 Huang ................. G09G 3/3655 345/212
2012/0162184 A1* 6/2012 Kim ..................... G09G 3/3655 345/212
2014/0340381 A1* 11/2014 Kim ..................... G09G 3/3677 345/212
2016/0118014 A1* 4/2016 Hsu ...................... G09G 3/3648 345/98
2016/0140920 A1* 5/2016 Lee ...................... G09G 3/3614 345/96
2016/0180781 A1* 6/2016 Kim ..................... G09G 3/3655 345/212
2016/0189662 A1* 6/2016 Cho ..................... G09G 3/3648 345/87
2017/0236485 A1* 8/2017 Lee ...................... G09G 3/3688 345/211
2023/0194934 A1* 6/2023 Sun ................... G02F 1/134372

FOREIGN PATENT DOCUMENTS

CN 103943083 A 7/2014
CN 106652934 A 5/2017
CN 106652968 A 5/2017
CN 107678216 A 2/2018
CN 109712557 A 5/2019
KR 20180003242 A 1/2018

* cited by examiner

| VOLTAGE DIFFERENCE | V1 | V2 | ... | Vj |
|---|---|---|---|---|
| COMPENSATION GRAY-SCALE VALUE | ΔD10 | ΔD20 | ... | ΔDj0 |

FIG. 5

| TARGET GRAY-SCALE VALUE | D1 | | | |
|---|---|---|---|---|
| VOLTAGE DIFFERENCE | V1 | V2 | ... | Vj |
| COMPENSATION GRAY-SCALE VALUE | ΔD11 | ΔD21 | ... | ΔDj1 |

| TARGET GRAY-SCALE VALUE | D2 | | | |
|---|---|---|---|---|
| VOLTAGE DIFFERENCE | V1 | V2 | ... | Vj |
| COMPENSATION GRAY-SCALE VALUE | ΔD12 | ΔD22 | ... | ΔDj2 |

...

| TARGET GRAY-SCALE VALUE | Di | | | |
|---|---|---|---|---|
| VOLTAGE DIFFERENCE | V1 | V2 | ... | Vj |
| COMPENSATION GRAY-SCALE VALUE | ΔD1j | ΔD2j | ... | ΔDji |

FIG. 6

LIQUID CRYSTAL DISPLAY (LCD) DRIVING CIRCUIT COMPENSATING GRAY-SCALE LOSS DUE TO ATTENUATION OF COMMON VOLTAGE

CROSS-REFERENCE TO RELATED APPLICATIONS

This application claims priority under 35 U.S.C. § 119 (a) to Chinese Patent Application No. 202310463117.2, filed Apr. 26, 2023, the entire disclosure of which is incorporated herein by reference.

TECHNICAL FIELD

This disclosure relates to the technical field of a driving circuit for a display panel, in particular to a driving circuit for a display panel, a display device, and a driving method.

BACKGROUND

Compared with the traditional Cathode Ray Tube (CRT) and plasma television, the Liquid Crystal Display (LCD) television has advantages of power saving, low radiation, small size, light weight, high resolution, etc., which is the mainstream television at present. A driving circuit for an LCD display panel includes multiple pixels, and common voltage lines provide common voltages VCOM for pixel capacitors (Clc) and storage capacitors (Cs) of the pixels, thereby providing reference voltages for a substrate of the liquid crystal display, and data lines provide gray-scale voltages VDATA for the pixels. When the pixel emits light, by controlling a voltage value of the gray-scale voltage VDATA, that is, controlling a voltage difference between the gray-scale voltage VDATA and the common voltage VCOM, the deflection angle of the liquid crystal is controlled, and the luminance of the pixel is further controlled.

The common voltage lines in the driving circuit for the display panel are all connected with each other. In an ideal situation, the VCOM voltages in the driving circuit for the display panel should be the same everywhere. However, because the common voltage line has its own impedance, the farther away from a common voltage source, the greater the voltage attenuation. Therefore, under the same gray-scale voltage VDATA, different brightness will be displayed at different positions of the driving circuit for the display panel, and the user experience is poor.

SUMMARY

A first aspect of the disclosure provides a driving circuit for a display panel. The display panel includes a common electrode. The driving circuit includes a common voltage feedback line and N common voltage detection units. The N common voltage detection units are electrically connected to N common voltage collection points of the common electrode in one-to-one correspondence, where the N common voltage collection points are N position points sequentially arranged along a power supply access end of the common electrode to a remote power supply end, and N>1. Each common voltage detection unit includes a switch module and a logic circuit. The switch module includes a first connection end, a second connection end, and a control end, where the first connection end is electrically connected to a common voltage collection point corresponding to the common voltage detection unit, and the second connection end is electrically connected to the common voltage feedback line. The logic circuit is electrically connected to the control end of the switch module. The N logic circuits respectively included in the N common voltage detection units sequentially output control signals to corresponding switch modules, and control N switch modules respectively included in the N common voltage detection units to sequentially turn on, to make the N common voltage collection points sequentially feed back common voltages to the common voltage feedback line through the turned-on switch modules, to sequentially output N common voltages corresponding to the N common voltage collection points through the common voltage feedback line.

A second aspect of the disclosure further provides a display device. The display device includes a housing, a power supply module, a display panel, and the driving circuit of the above. The driving circuit is electrically connected to the display panel and the power supply module, the power supply module is used to provide a working power supply for the driving circuit, the driving circuit is used to drive the display panel to display, and the housing is used to fix the power supply module, the display panel, and the driving circuit.

A third aspect of the disclosure further provides a driving method. The driving method is applied to the driving circuit for the display panel of the above. The display panel includes a common electrode and M rows of sub-pixel units, and the driving method includes: obtaining the N common voltages corresponding to the N common voltage collection points, where the N common voltage collection points are the N position points sequentially arranged along the power supply access end to the remote power supply end of the common electrode, and 1<N≤M; determining a common voltage corresponding to each row of sub-pixel units according to the N common voltages corresponding to the N common voltage collection points; determining a compensation gray-scale value of each sub-pixel unit according to the common voltage corresponding to each row of sub-pixel units; and compensating gray-scale data of a frame to-be-displayed according to the compensation gray-scale value of each sub-pixel unit, and outputting the compensated gray-scale data to the display panel to drive the display panel to display.

BRIEF DESCRIPTION OF THE DRAWINGS

FIG. 5 is a first preset compensation gray-scale mapping table provided in embodiments of the disclosure.

FIG. 6 is a second preset compensation gray-scale mapping table provided in embodiments of the disclosure.

DETAILED DESCRIPTION

A clear and complete description of technical solutions of embodiments of the disclosure will be given below in conjunction with accompanying drawings in the embodiments of the disclosure, and it will be apparent that the described embodiments are only part of rather than all of the embodiments of the disclosure. Based on the embodiments in the disclosure, all other embodiments obtained without creative effort by those of ordinary skill in the art fall within the scope of protection of the disclosure.

In the description of the disclosure, it should be noted that terms “first”, “second”, and the like are used for descriptive purposes only and are not understood to indicate or imply relative importance.

Figure 1:
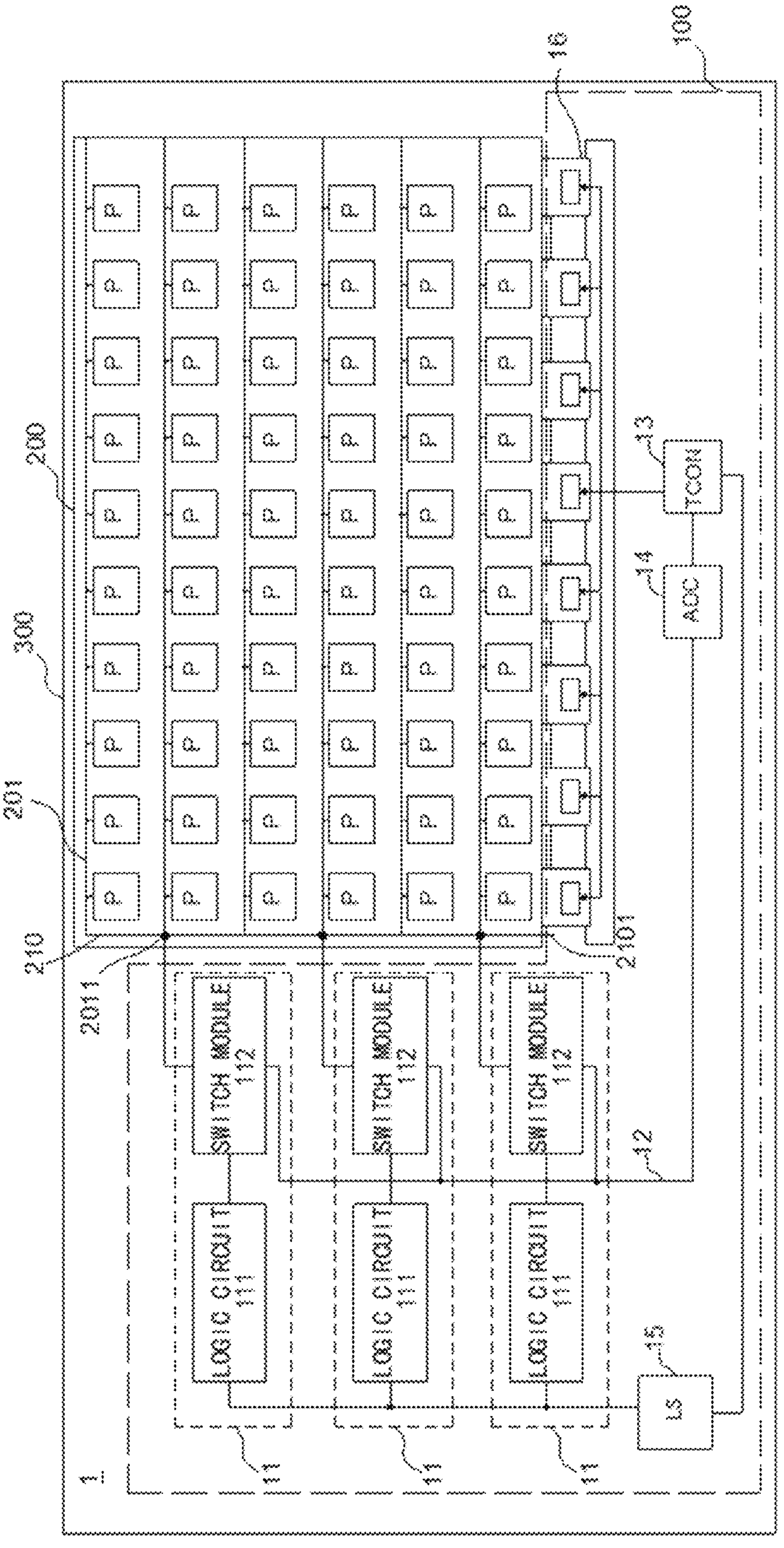
FIG. 1 is a schematic structural diagram of a display device provided in embodiments of the disclosure.

Referring to FIG. 1, the disclosure provides a driving circuit 100. The driving circuit 100 is for driving a display panel 200 for display. The display panel 200 includes a common electrode.

The driving circuit 100 includes a common voltage feedback line 12 and N common voltage detection units 11. The N common voltage detection units 11 are electrically connected to N common voltage collection points 2011 of the common electrode in one-to-one correspondence. The N common voltage collection points 2011 are N position points sequentially arranged along a power supply access end 2101 of the common electrode to a remote power supply end, where N>1. The remote power supply end refers to an end of the common electrode away from the power supply access end 2101. For example, as shown in FIG. 1, the power supply access end 2101 is located at the bottom of the display panel 200, while the remote power supply end is located at the top of the display panel 200.

Specifically, each common voltage detection unit 11 includes a logic circuit 111 and a switch module 112.

The switch module 112 includes a first connection end, a second connection end, and a control end, the first connection end of the switch module 112 is electrically connected to a common voltage collection point 2011 corresponding to the common voltage detection unit 11, and the second connection end of the switch module 112 is electrically connected to the common voltage feedback line 12.

The logic circuit 111 is electrically connected to the control end of the switch module 112.

In operation, the N logic circuits 111 respectively included in the N common voltage detection units 11 sequentially output control signals to corresponding switch modules 112 to control the N switch modules 112 respectively included in the N common voltage detection units 11 to sequentially turn on, to make the N common voltage collection points 2011 sequentially feed back common voltages to the common voltage feedback line 12 through the turned-on switch modules 112, to sequentially output N common voltages corresponding to the N common voltage collection points 2011 through the common voltage feedback line 12.

By arranging the N logic circuits 111, the N switch modules 112, and the common voltage feedback line 12 electrically connected to all the N switch modules 112 and sequentially outputting the control signals to the corresponding switch modules 112 through the N logic circuits 111, the driving circuit 100 provided in the disclosure can control the N switch modules 112 to sequentially turn on, so that the N common voltage collection points 2011 sequentially feed back the common voltages to the common voltage feedback line 12 through the turned-on switch modules 112. As such, the common voltages at the N position points sequentially arranged along the power supply access end 2101 of the common electrode to the remote power supply end in the display panel 200 can be sequentially output through the common voltage feedback line 12, so that according to the common voltages at the N position points, gray-scale data of a frame to-be-displayed can be compensated or the common voltage can be accurately compensated, and uneven display brightness of the display panel 200 caused by attenuation of the common voltage when transmitted in the common electrode can be solved.

Further, the display panel 200 includes M×L sub-pixel units P arranged in M rows and L columns. As illustrated in FIG. 1, the common electrode includes M common voltage lines 201 extending in a row direction and distributed at parallel intervals in a column direction, at least one common voltage access line 210 extending in the column direction and electrically connected to each of the M common voltage lines 201, and M×L common electrode blocks (not shown) located in the M×L sub-pixel units P, where each common voltage line 201 is electrically connected to one row of sub-pixel units P. In this case, the power supply access end 2101 of the common electrode is an end where the common voltage access line 210 is electrically connected to a power supply module, the remote power supply end is an end of the common voltage access line 210 away from the power supply module, and the N common voltage collection points 2011 are position points on N common voltage lines to-be-detected sequentially arranged from the power supply access end 2101 of the common electrode to the remote power supply end in the M common voltage lines 201. In other embodiments, the common electrode may also include L common voltage lines 201 extending in the column direction and distributed at parallel intervals in the row direction, an end of each of the common voltage lines 201 (i.e., the power supply access end 2101) is electrically connected to the power supply module, and each of the common voltage lines 201 is electrically connected to one row of sub-pixel units P. In this case, the N common voltage collection points 2011 may be N position points sequentially arranged along an extending direction of the common voltage line 201 in one common voltage line 201.

Further, the driving circuit 100 also includes a timing controller (TCON) 13 electrically connected to the common voltage feedback line 12 and the display panel 200 respectively. The timing controller 13 is used to obtain the N common voltages corresponding to the N common voltage collection points 2011 output from the common voltage feedback line 12, compensate gray-scale data of a frame to-be-displayed according to the N common voltages corresponding to the N common voltage collection points 2011, and output the compensated gray-scale data to the display panel 200 to drive the display panel 200 for display. As such, gray-scale loss caused by attenuation of the common voltage in the display panel 200 can be compensated and uneven display brightness of the display panel 200 can be solved.

In the driving circuit 100 provided in the disclosure, the timing controller 13 does not need to provide a signal input port for each common voltage collection point 2011, and the common voltages at the N common voltage collection points 2011 can be collected through one common voltage feedback line 12, so that ports of the timing controller 13 can be saved.

Optionally, the driving circuit 100 also includes an Analog-to-Digital Converter (ADC) 14 electrically connected between the timing controller 13 and the common voltage feedback line 12. The analog-to-digital converter 14 is used to convert the N common voltages sequentially output from the common voltage feedback line 12 into digital signals and then output them to the timing controller 13. In addition, in embodiments of the disclosure, the common voltages output from the common voltage feedback line 12 to the analog-to-digital converter 14 are serial signals. When the analog-to-digital converter 14 performs analog-to-digital conversion on the N common voltages, the analog-to-digital converter 14 can also convert the serial signals into parallel signals and then output them to the timing controller 13. In other embodiments the analog-to-digital converter 14 may also be integrated in the timing controller 13.

Optionally, the driving circuit 100 further includes multiple source drivers 16 electrically connected between the timing controller 13 and the display panel 200. The timing controller 13 outputs gray-scale data of frames to-be-displayed to the display panel 200 through the multiple source drivers 16.

Figure 2:
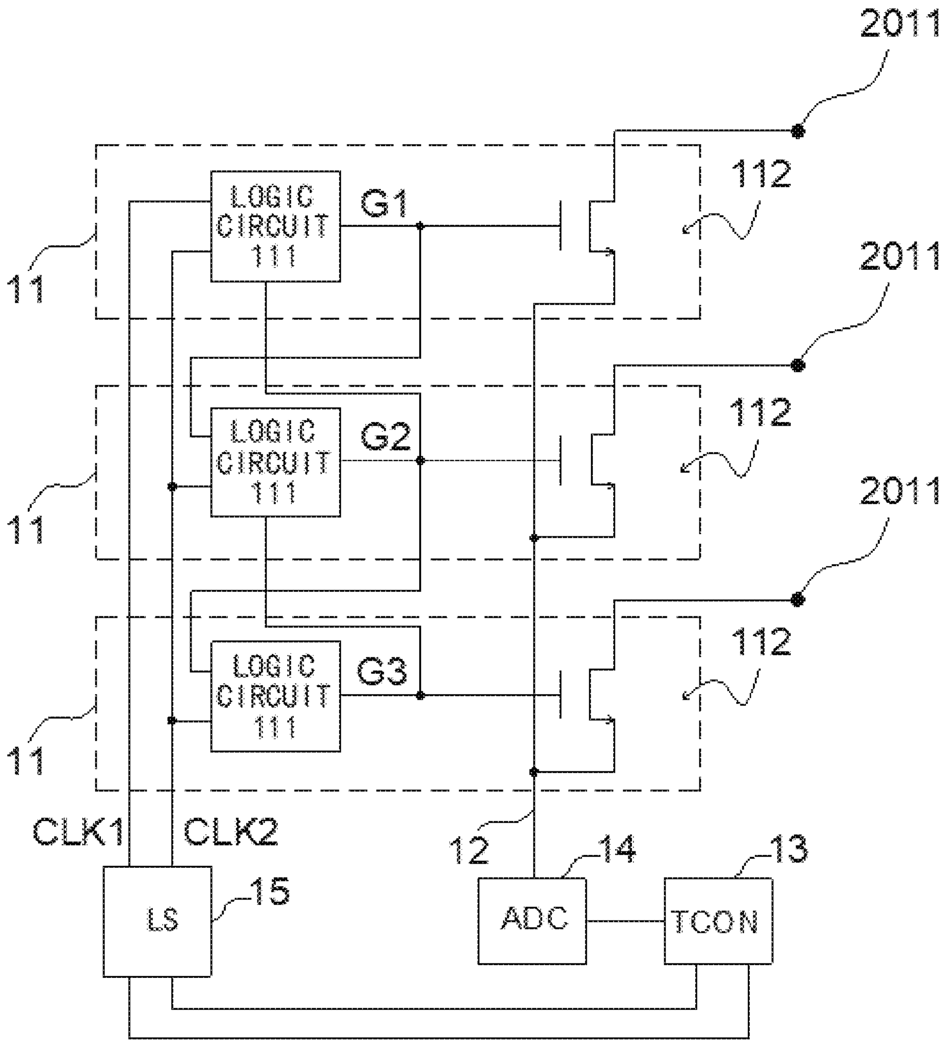
FIG. 2 is a schematic structural diagram of a driving circuit in the display device shown in FIG. 1.
Figure 3:
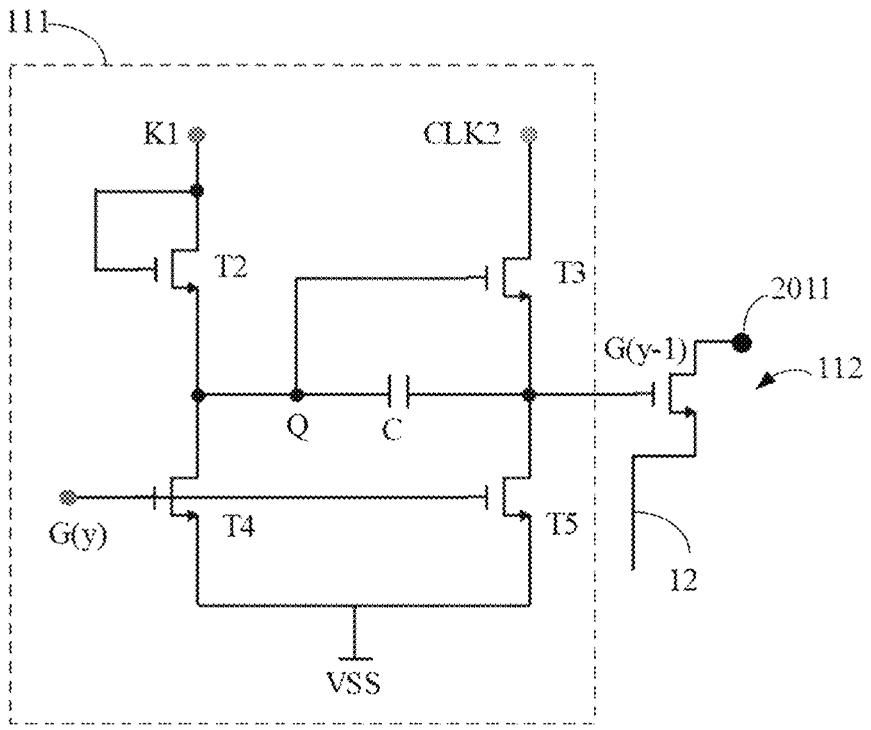
FIG. 3 is a circuit diagram of a logic circuit in the driving circuit shown in FIG. 2.

Further, referring to FIG. 2 and FIG. 3, the N logic circuits 111 are cascaded, where each logic circuit 111 includes an energy storage module C, a trigger module T2, and a control signal output module T3. The trigger module T2 and the control signal output module T3 each include a first connection end, a second connection end, and a control end, and the energy storage module C includes a first end and a second end.

The first end of the energy storage module C is electrically connected to the second connection end of the trigger module T2 and the control end of the control signal output module T3 respectively, and the second end of the energy storage module C is electrically connected to the second connection end of the control signal output module T3.

The first connection end of the trigger module T2 is electrically connected to the control end of the trigger module T2, and the control end of the trigger module T2 is used to receive a trigger signal K1.

The first connection end of the control signal output module T3 is electrically connected to the timing controller 13, the first connection end of the control signal output module T3 is used to receive a clock signal CLK2 provided by the timing controller 13, the second connection end of the control signal output module T3 is electrically connected to the control end of the switch module 112 corresponding to its logic circuit 111, and the second connection end of the control signal output module T3 is used to output the corresponding control signal to the control end of the switch module 112 corresponding to its logic circuit 111.

The trigger module T2 is turned on in response to the trigger signal K1, to charge the energy storage module C, so that the potential of the control end of the control signal output module T3 changes to a first level. The control signal output module T3 is used to output the control signal to the corresponding switch module 112 through its second connection end when the potential of its control end and the clock signal CLK2 are both at the first level. The trigger signal Kl received by a first connection end of a trigger module T2 in a first logic circuit 111 is a feedback start signal CLK1 output by the timing controller 13, and a trigger signal K1 received by a first connection end of a trigger module T2 in a y-th logic circuit 111 of the N logic circuits 111 is a control signal G(y−1) output by a (y−1)-th logic circuit 111, where N≥y≥2. As shown in FIG. 2 and FIG. 3, the first connection end of the trigger module T2 in the first logic circuit 111 is electrically connected to the timing controller 13, and the first connection end of the trigger module T2 in the y-th logic circuit 111 is electrically connected to a second connection end of a control signal output module T3 in the (y−1)-th logic circuit 111. That is, an on-state state of the trigger module T2 in the first logic circuit 111 is controlled by the feedback start signal CLK1 output from the timing controller 13, and an on-state of the trigger module T2 in the y-th logic circuit 111 is controlled by the control signal G(y−1) output from the control signal output module T3 in the (y−1)-th logic circuit 111. The first connection end of the control signal output module T3 in each logic circuit 111 is electrically connected to the timing controller 13 to receive the clock signal CLK2.

Optionally, the driving circuit 100 further includes a Level Shifter (LS) 15 electrically connected between the logic circuits 111 and the timing controller 13, and the level shifter 15 is used for level shifting of the feedback start signal CLK1 and the clock signal CLK2 output by the timing controller 13, to improve the driving capability of the feedback start signal CLK1 and the clock signal CLK2.

Further as shown in FIG. 3, the (y−1)-th logic circuit 111 of the N logic circuits 111 further includes a first reset module T4 and a second reset module T5.

The first reset module T4 includes a first connection end, a second connection end, and a control end. The first connection end of the first reset module T4 is electrically connected to a control end of a control signal output module T3 in the (y−1)-th logic circuit 111. The second connection end of the first reset module T4 is used to receive a second level VSS. The control end of the first reset module T4 is electrically connected to a second connection end of a control signal output module T3 in the y-th logic circuit 111. The first reset module T4 is turned on when receiving a control signal G (y) output by the y-th logic circuit 111, to reset a potential of the control end of the control signal output module T3 in the (y−1)-th logic circuit 111 to the second level VSS, to turn off the control signal output module T3 in the (y−1)-th logic circuit 111.

The second reset module T5 includes a first connection end, a second connection end, and a control end. The first connection end of the second reset module T5 is electrically connected to the second connection end of the control signal output module T3 in the (y−1)-th logic circuit 111. The second connection end of the second reset module T5 is used to receive the second level VSS. The control end of the second reset module T5 is electrically connected to the second connection end of the control signal output module T3 in the y-th logic circuit 111. The second reset module T5 is turned on when receiving the control signal G (y) output by the y-th logic circuit 111, to reset a potential of the second connection end of the control signal output module T3 in the (y−1)-th logic circuit 111 to the second level VSS, so that the (y−1)-th logic circuit 111 stops outputting the control signal G(y−1).

Further, the y-th logic circuit 111 may adopt the circuit configuration shown in FIG. 3. In this case, the control ends of the first reset module T4 and the second reset module T5 in the y-th logic circuit 111 are electrically connected to the second connection end of the control signal output module T3 of the first logic circuit 111, that is, on-states of the first reset module T4 and the second reset module T5 in the y-th logic circuit 111 are controlled by a control signal G1 output from the first logic circuit 111.

Thus, arranging the first reset module T4 and the second reset module T5 in each logic circuit 111 can ensure that the N logic circuits 111 output only one control signal at any time to control one switch module 112 to be turned on, so that the common voltage feedback line 12 only feeds back the common voltage of one common voltage collection point 2011 to the timing controller 13 at any time, and the sampling accuracy can be improved.

Figure 4:
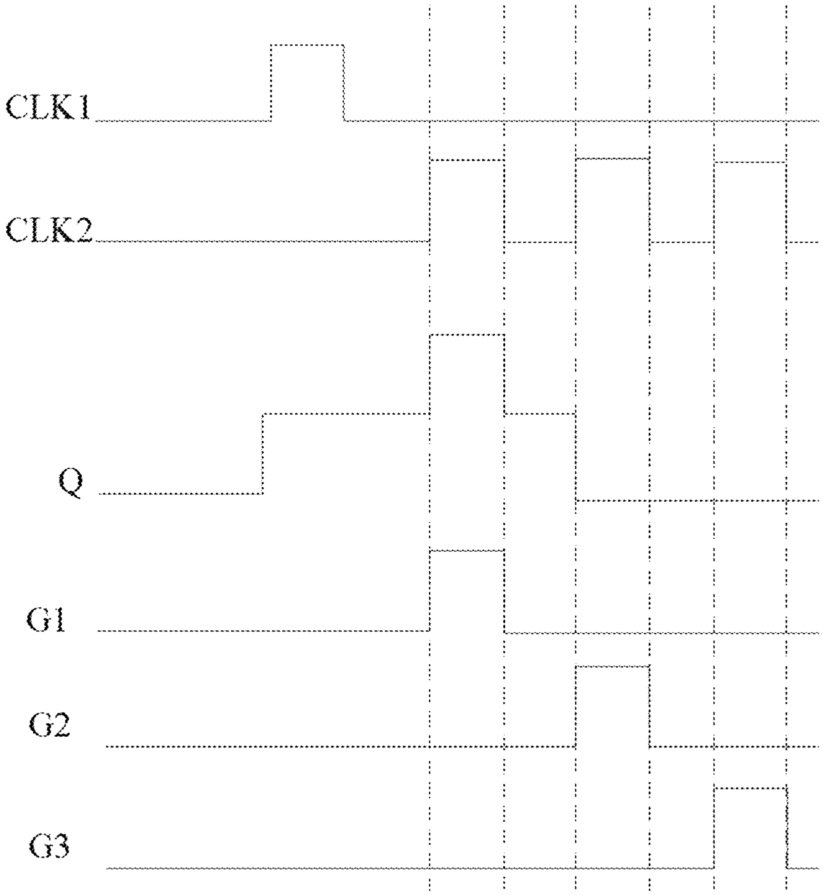
FIG. 4 is a timing diagram of signals of the logic circuit shown in FIG. 3.

The working principle of each common voltage detection unit 11 will be explained with reference to FIGS. 1-4. FIG. 4 is a timing diagram of signals of the logic circuit 111.

The working process of the first logic circuit 111 is as follows. The trigger module T2 is turned on in response to the feedback start signal CLK1, to charge the energy storage module C, to pull up the potential of the control end (i.e., the Q node) of the control signal output module T3 to the first level, so that the control signal output module T3 is turned on. When the feedback start signal CLK1 ends, the energy storage module C can continuously discharge with the charging charge, so that the control signal output module T3 can continuously conduct. When a first pulse of the clock signal CLK2 arrives, the first connection end of the control signal output module T3 is at the first level, thereby outputting the first pulse of the clock signal CLK2 through the second connection end, i.e., outputting the control signal G1, thereby controlling the switch module 112 corresponding to the logic circuit 111 to be turned on, so that the first common voltage collection point 2011 feeds back the common voltage to the timing controller 13 through the turned-on switch module 112 and the common voltage feedback line 12. Thereafter, the first reset module T4 is turned on upon receiving the control signal G2 output from the second logic circuit 111 to reset the potential of the control end of the control signal output module T3 to the second level VSS, so that the control signal output module T3 is turned off. The second reset module T5 is turned on upon receiving the control signal G2 output by the second logic circuit 111, to reset the potential of the second connection end of the control signal output module T3 to the second level VSS, so that the logic circuit 111 stops outputting the control signal G1, thereby controlling the switch module 112 corresponding to the logic circuit 111 to be turned off, so that the first common voltage collection point 2011 stops feeding back the common voltage to the timing controller 13. At the same time, the energy storage module C can release residual charges through the conductive first reset module T4 and the second reset module T5.

The working process of the second to third logic circuits 111 is similar to that of the first logic circuit 111, except that the trigger module T2 in the second logic circuit 111 is turned on in response to the control signal G1 output from the first logic circuit 111, to charge the energy storage module C and the trigger module T2 in the third logic circuit 111 is turned on in response to the control signal G2 output from the second logic circuit 111, to charge the energy storage module C.

Thus, the N common voltage collection points can sequentially output the common voltages through the common voltage feedback line 12.

As an example, the switch module 112, the trigger module T2, the control signal output module T3, the first reset module T4, and the second reset module T5 may all employ Thin Film Transistors (TFTs). For example, an amorphous silicon thin film transistor (a-Si TFT), a low temperature polysilicon thin film transistor (LTPS TFT), or an oxide semiconductor thin film transistor (Oxide TFT) may be employed. In embodiments of the disclosure, the switch module 112, the trigger module T2, the control signal output module T3, the first reset module T4, and the second reset module T5 are all high-level conduction transistors, that is, the first level is high and the second level VSS is low. In other embodiments, the switch module 112, the trigger module T2, the control signal output module T3, the first reset module T4, and the second reset module T5 may also employ low-level conduction transistors, which are not limited herein.

In embodiments of the disclosure, a frequency at which the driving circuit 100 collects the common voltage is determined by the feedback start signal CLK1 and the clock signal CLK2. For example, the frequency at which the timing controller 13 outputs the feedback start signal CLK1 may be once per frame, or once per second, etc. The frequency of the clock signal CLK2 may be adjusted accordingly according to the frequency of the feedback start signal CLK1 and the number of the common voltage collection points 2011.

It can be understood that, the farther the distance between the sub-pixel unit P in the display panel 200 and the power supply access end 2101 of the common electrode, the greater the attenuation degree of the common voltage received by the sub-pixel unit P, and the attenuation degrees of the common voltages received by the sub-pixel units P in the same row are approximately the same. Therefore, the greater the number of the N common voltage collection points 2011, the more evenly distributed in the direction from the power supply access end 2101 of the common electrode to the remote power supply end, the higher the accuracy of the collected common voltage, and the higher the accuracy of compensation of the gray-scale data of the frame to-be-displayed. In embodiments of the disclosure, two adjacent common voltage collection points 2011 are separated by at least one row of sub-pixel units P. The N common voltage collection points 2011 are distributed in the display panel 200 at equal intervals, that is, distances between any two adjacent common voltage collection points 2011 in the direction from the power supply access end 2101 of the common electrode to the remote power supply end are approximately equal. Thus, the collected N common voltages are more representative, which is beneficial to improving the accuracy of voltage compensation, thereby further improving the brightness uniformity of the display panel 200. It should be noted that, in embodiments of the disclosure, N=3 is as an example, which is not regarded as limiting to the value of N. In other embodiments, N can be 2, 4, 8, 10, etc. Exemplarily, in one embodiment, M=1080, N=10, that is, the display panel 200 includes 1080 rows of sub-pixel units P and 1080 common voltage lines 201 electrically connected to the 1080 rows of sub-pixel units P in one-to-one correspondence, and 10 common voltage collection points 2011 evenly distributed are disposed on the 1080 common voltage lines 201.

Further, the timing controller 13 is used to determine the common voltage corresponding to each row of sub-pixel units P according to the N common voltages corresponding to the N common voltage collection points 2011, determine the compensation gray-scale value of each sub-pixel unit P according to the common voltage corresponding to each row of sub-pixel units P, and compensate the gray-scale data of the frame to-be-displayed according to the compensation gray-scale value of each sub-pixel unit P to obtain the compensated gray-scale data.

As an example, the timing controller 13 may determine the common voltage corresponding to each row of sub-pixel units P by using a linear interpolation method according to the N common voltages corresponding to the N common voltage collection points and the distribution of the N common voltage collection points 2011. For example, one common voltage collection point 2011 is disposed on the first and ($x\times108$)-th common voltage lines 201, where $10\geq x\geq 1$. Then, the common voltages corresponding to the sub-pixel units P in the first row and the ($x\times108$)-th row are the common voltage output from the first and ($x\times108$)-th common voltage line 201, and the common voltages corresponding to the sub-pixel units P in other rows than the first row and the ($x\times108$)-th row can be determined with linear interpolation based on the common voltages output from the first and ($x\times108$)-th common voltage lines 201.

Further, in one embodiment, the timing controller 13 is used to determine the compensation gray-scale value of each sub-pixel unit P according to a first preset compensation gray-scale mapping table and a voltage difference between the common voltage corresponding to each row of sub-pixel units P and a target common voltage. The first preset compensation gray-scale mapping table records a mapping relationship between multiple voltage differences and multiple compensation gray-scale values. The first preset compensation gray-scale mapping table can be obtained experimentally before the display panel 200 leaves the factory. Exemplarily, the target common voltage is 6V. As shown in FIG. 5, the multiple voltage differences are V1, V2, . . . , Vj, respectively, and the multiple compensation gray-scale values are ΔD10, ΔD20, . . . , ΔDj0, respectively.

In another embodiment, the timing controller 13 is used to determine the compensation gray-scale value of each sub-pixel unit P according to a second preset compensation gray-scale mapping table, the voltage difference between the common voltage corresponding to each row of sub-pixel units P and the target common voltage, and the gray-scale data of the frame to-be-displayed. The gray-scale data of the frame to-be-displayed includes a target gray-scale value corresponding to each sub-pixel unit P. The second preset compensation gray-scale mapping table records a mapping relationship between multiple voltage differences and multiple compensation gray-scale values under each target gray-scale value. The second preset compensation gray-scale mapping table can be obtained experimentally before the display panel 200 leaves the factory. Exemplarily, the target common voltage is 6V. As shown in FIG. 6, the target gray-scale values include D1, D2. . . . Di, and there is a mapping table between j voltage differences (including V1, V2. . . . Vj) and j compensation gray-scale values under each target gray-scale value. Assuming that the target gray-scale value of a certain sub-pixel unit P is D2, when the voltage difference between the common voltage corresponding to the sub-pixel unit P and the target common voltage is V0 (for example, V0 is closest to V2), the timing controller 13 can obtain the voltage difference V2 closest to the voltage difference V0 and the compensation gray-scale value ΔD22 corresponding to the voltage difference V2 under the target gray-scale value D2 by looking up the table, where 1≤i, 1≤j. It can be understood that, although the attenuation degrees of the common voltages received by the sub-pixel units P in the same row are approximately the same, the target gray-scale values of the sub-pixel units P in the same row may be different. However, the loss values of luminance of different target gray-scale values caused by the same attenuation value of the common voltage are not exactly the same. Therefore, if each sub-pixel unit P in the same row is compensated according to the same compensation gray-scale value, the compensation accuracy may not be high, for example, some sub-pixel units P are overcompensated and some sub-pixel units P are undercompensated. However, in this embodiment, the compensation gray-scale value is determined according to the voltage difference between the common voltage corresponding to the sub-pixel unit P and the target common voltage and the target gray-scale value, so that the compensation accuracy can be higher and the display effect can be better.

Referring again to FIG. 1, based on the same inventive concept, the disclosure further provides a display device 1. The display device 1 includes a housing 300, a power supply module (not shown), a display panel 200, and the driving circuit 100 according to any of the above embodiments. The driving circuit 100 is electrically connected to the display panel 200 and the power supply module, the power supply module is used to provide a working power supply for the driving circuit 100, the driving circuit 100 is used to drive the display panel 200 to display, and the housing 300 is used to fix the power supply module, the display panel 200, and the driving circuit 100. Optionally, the power supply module is further electrically connected to the power supply access end 2101 of the common electrode of the display panel 200, and the power supply module is further used to input a common voltage to the common electrode of the display panel 200.

Figure 7:
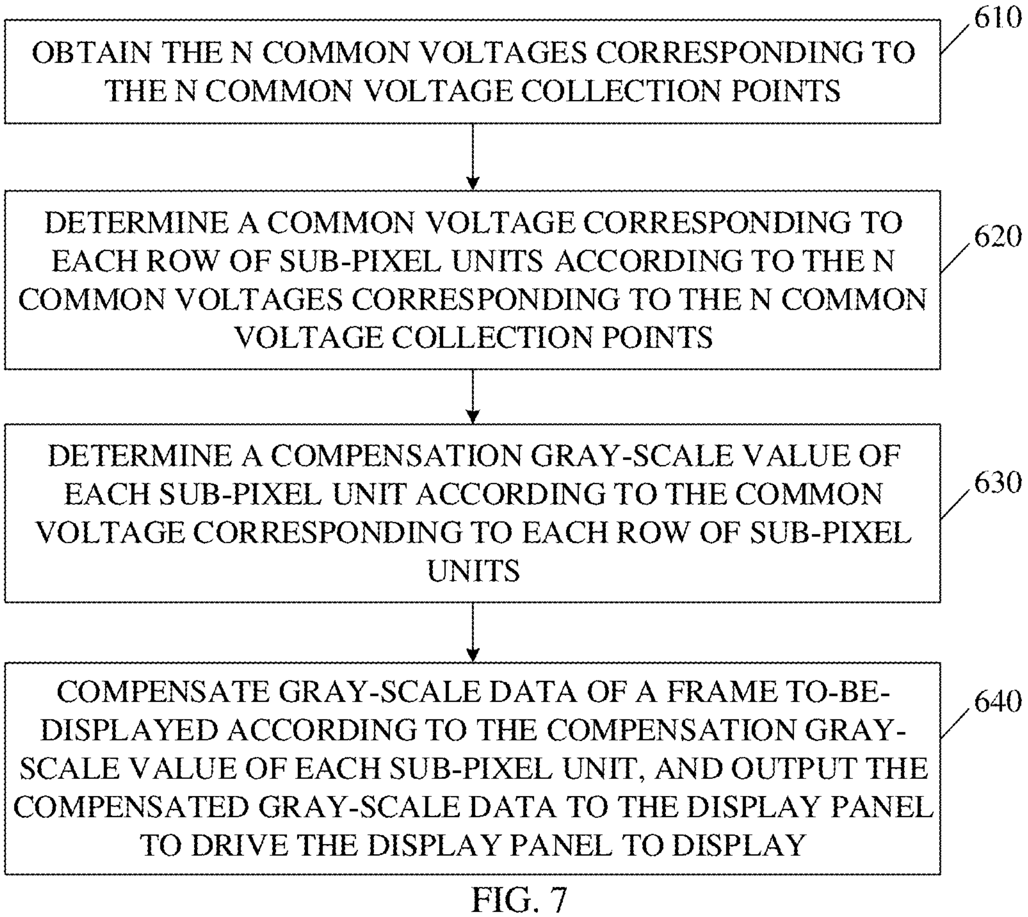
FIG. 7 is a flowchart of a driving method provided in embodiments of the disclosure.

Referring to FIG. 7, based on the same inventive concept, the disclosure further provides a driving method. The driving method is applied to the driving circuit 100 of any of the above embodiments, and includes the following.

At block 610, the N common voltages corresponding to the N common voltage collection points 2011 are obtained. The N common voltage collection points 2011 are the N position points sequentially arranged along the power supply access end 2101 of the common electrode to the remote power supply end, where 1<N≤M.

At block 620, a common voltage corresponding to each row of sub-pixel units P is determined according to the N common voltages corresponding to the N common voltage collection points 2011.

At block 630, a compensation gray-scale value of each sub-pixel unit P is determined according to the common voltage corresponding to each row of sub-pixel units P.

At block 640, gray-scale data of a frame to-be-displayed is compensated according to the compensation gray-scale value of each sub-pixel unit P, and the compensated gray-scale data is output to the display panel 200 to drive the display panel 200 to display.

Specifically, the compensation gray-scale value of each sub-pixel unit P is added to the target gray-scale value to obtain the compensated gray-scale data.

Further, the driving circuit 100 further includes the common voltage feedback line 12 and the N common voltage detection units 11 connected to the N common voltage collection points 2011 of the common electrode in one-to-one correspondence. Each common voltage detection unit 11 includes the switch module 112 and the logic circuit 111. The switch module 112 includes the first connection end, the second connection end, and the control end. The first connection end is electrically connected to the common voltage collection point 2011 corresponding to the common voltage detection unit 11, and the second connection end is electrically connected to the common voltage feedback line 12. The logic circuit 111 is electrically connected to the control end of the switch module 112.

In this embodiment, before performing the operation at block 610, the driving method further includes the following.

At block 601, the control signals are sequentially output to corresponding switch modules 112 through the N logic circuits 111 and the N switch modules 112 respectively included in the N common voltage detection units 11 are controlled to sequentially turn on, to make the N common voltage collection points 2011 sequentially feed back the common voltages to the common voltage feedback line 12 through the turned-on switch modules 112, to sequentially output the N common voltages corresponding to the N common voltage collection points 2011 through the common voltage feedback line 12.

As described above, the timing controller 13 outputs the feedback start signal CLK1 to the first logic circuit 111 and the clock signal CLK2 to each logic circuit 111, and can control the N logic circuits 111 to sequentially output the control signals to the corresponding switch modules 112.

The working principle of the logic circuits 111 has been described in detail above and will not be described herein.

Further, the operation at block 610 includes: obtaining the N common voltages corresponding to the N common voltage collection points 2011 sequentially output from the common voltage feedback line 12.

Further, in one embodiment, the operation at block 630 includes: determining the compensation gray-scale value of each sub-pixel unit P according to a first preset compensation gray-scale mapping table and a voltage difference between the common voltage corresponding to each row of sub-pixel units P and a target common voltage. The first preset compensation gray-scale mapping table records a mapping relationship between multiple voltage differences and multiple compensation gray-scale values.

In another embodiment, the operation at block 630 includes: determining the compensation gray-scale value of each sub-pixel unit P according to a second preset compensation gray-scale mapping table, the voltage difference between the common voltage corresponding to each row of sub-pixel units P and the target common voltage, and the gray-scale data of the frame to-be-displayed. The gray-scale data of the frame to-be-displayed includes a target gray-scale value corresponding to each sub-pixel unit P. The second preset compensation gray-scale mapping table records a mapping relationship between multiple voltage differences and multiple compensation gray-scale values under each target gray-scale value.

It should be noted that all operations in the driving method described in any of the above embodiments may be executed by the timing controller 13.

For the driving method provided in the disclosure, the N common voltages corresponding to the N common voltage collection points are obtained, the common voltage corresponding to each row of sub-pixel units is determined according to the N common voltages corresponding to the N common voltage collection points, the compensation gray-scale value of each sub-pixel unit is determined according to the common voltage corresponding to each row of sub-pixel units, and the gray-scale data of the frame to-be-displayed is compensated according to the compensation gray-scale value of each sub-pixel unit, and the compensated gray-scale data is output to the display panel to drive the display panel to display. As such, the gray-scale data of the frame to-be-displayed can be accurately compensated according to the common voltages at the N position points, and uneven display brightness of the display panel 200 caused by attenuation of the common voltage when transmitted in the common electrode can be solved.

In conclusion, the disclosure provides a driving circuit for a display panel. The display panel includes a common electrode. The driving circuit includes a common voltage feedback line and N common voltage detection units. The N common voltage detection units are electrically connected to N common voltage collection points of the common electrode in one-to-one correspondence, where the N common voltage collection points are N position points sequentially arranged along a power supply access end of the common electrode to a remote power supply end, and N>1. Each common voltage detection unit includes a switch module and a logic circuit. The switch module includes a first connection end, a second connection end, and a control end, where the first connection end is electrically connected to a common voltage collection point corresponding to the common voltage detection unit, and the second connection end is electrically connected to the common voltage feedback line. The logic circuit is electrically connected to the control end of the switch module. The N logic circuits respectively included in the N common voltage detection units sequentially output control signals to corresponding switch modules, and control N switch modules respectively included in the N common voltage detection units to sequentially turn on, to make the N common voltage collection points sequentially feed back common voltages to the common voltage feedback line through the turned-on switch modules, to sequentially output N common voltages corresponding to the N common voltage collection points through the common voltage feedback line.

By arranging the N logic circuits, the N switch modules, and the common voltage feedback line electrically connected to all the N switch modules and sequentially outputting the control signals to the corresponding switch modules through the N logic circuits, the driving circuit provided in the disclosure can control the N switch modules to sequentially turn on, so that the N common voltage collection points sequentially feed back the common voltages to the common voltage feedback line through the turned-on switch modules. As such, the common voltages at the N position points sequentially arranged along the power supply access end of the common electrode to the remote power supply end in the display panel can be sequentially output through the common voltage feedback line, so that according to the common voltages at the N position points, gray-scale data of a frame to-be-displayed can be compensated or the common voltage can be accurately compensated, and uneven display brightness of the display panel caused by attenuation of the common voltage when transmitted in the common electrode can be solved.

Optionally, the driving circuit further includes a timing controller electrically connected to the common voltage feedback line and the display panel. The timing controller is used to obtain the N common voltages corresponding to the N common voltage collection points output from the common voltage feedback line, compensate gray-scale data of a frame to-be-displayed according to the N common voltages corresponding to the N common voltage collection points, and output the compensated gray-scale data to the display panel to drive the display panel to display.

Optionally, the N logic circuits are cascaded, and each logic circuit includes an energy storage module, a trigger module, and a control signal output module. The trigger module and the control signal output module each include a first connection end, a second connection end, and a control end, and the energy storage module includes a first end and a second end. The first end of the energy storage module is electrically connected to the second connection end of the trigger module and the control end of the control signal output module respectively, and the second end of the energy storage module is electrically connected to the second connection end of the control signal output module. The first connection end of the trigger module is electrically connected to the control end of the trigger module, and the control end of the trigger module is used to receive a trigger signal. The first connection end of the control signal output module is electrically connected to the timing controller, the first connection end of the control signal output module is used to receive a clock signal provided by the timing controller, and the second connection end of the control signal output module is electrically connected to the control end of the switch module corresponding to the logic circuit. The trigger module is turned on in response to the trigger signal, to charge the energy storage module, to change a potential of the control end of the control signal output module to a first level, the control signal output module is used to output the control signal to the corresponding switch module through the second connection end when the potential of the control end and the clock signal are both at the first level, a trigger signal received by a first connection end of a trigger module in a first logic circuit is a feedback start signal output by the timing controller, a trigger signal received by a first connection end of a trigger module in a y-th logic circuit of the N logic circuits is a control signal output by a (y−1)-th logic circuit, and N≥y≥2.

Optionally, the (y−1)-th logic circuit of the N logic circuits further includes a first reset module and a second reset module. The first reset module includes a first connection end, a second connection end, and a control end, where the first connection end of the first reset module is electrically connected to a control end of a control signal output module in the (y−1)-th logic circuit, the second connection end of the first reset module is used to receive a second level, and the control end of the first reset module is electrically connected to a second connection end of a control signal output module in the y-th logic circuit, and the first reset module is turned on when receiving a control signal output by the y-th logic circuit, to reset a potential of the control end of the control signal output module in the (y−1)-th logic circuit to the second level, to turn off the control signal output module in the (y−1)-th logic circuit. The second reset module includes a first connection end, a second connection end, and a control end, where the first connection end of the second reset module is electrically connected to a second connection end of the control signal output module in the (y−1)-th logic circuit, the second connection end of the second reset module is used to receive the second level, and the control end of the second reset module is electrically connected to the second connection end of the control signal output module in the y-th logic circuit, and the second reset module is turned on when receiving the control signal output by the y-th logic circuit, to reset a potential of the second connection end of the control signal output module in the (y−1)-th logic circuit to the second level, to stop the (y−1)-th logic circuit from outputting the control signal.

Optionally, the display panel further includes M rows of sub-pixel units, M>N, and two adjacent common voltage collection points are spaced apart by at least one row of sub-pixel units. The timing controller is used to determine a common voltage corresponding to each row of sub-pixel units according to the N common voltages corresponding to the N common voltage collection points, determine a compensation gray-scale value of each sub-pixel unit according to the common voltage corresponding to each row of sub-pixel units, and compensate the gray-scale data of the frame to-be-displayed according to the compensation gray-scale value of each sub-pixel unit, to obtain the compensated gray-scale data.

Optionally, the timing controller is used to determine the compensation gray-scale value of each sub-pixel unit according to a first preset compensation gray-scale mapping table and a voltage difference between the common voltage corresponding to each row of sub-pixel units and a target common voltage. The first preset compensation gray-scale mapping table records a mapping relationship between multiple voltage differences and multiple compensation gray-scale values.

Optionally, the timing controller is used to determine the compensation gray-scale value of each sub-pixel unit according to a second preset compensation gray-scale mapping table, a voltage difference between the common voltage corresponding to each row of sub-pixel units and a target common voltage, and the gray-scale data of the frame to-be-displayed, and the gray-scale data of the frame to-be-displayed includes a target gray-scale value corresponding to each sub-pixel unit. The second preset compensation gray-scale mapping table records a mapping relationship between multiple voltage differences and multiple compensation gray-scale values under each target gray-scale value.

The disclosure further provides a display device. The display device includes a housing, a power supply module, a display panel, and the driving circuit of the above. The driving circuit is electrically connected to the display panel and the power supply module, the power supply module is used to provide a working power supply for the driving circuit, the driving circuit is used to drive the display panel to display, and the housing is used to fix the power supply module, the display panel, and the driving circuit.

The disclosure further provides a driving method. The driving method is applied to the driving circuit for the display panel of the above. The display panel includes a common electrode and M rows of sub-pixel units, and the driving method includes: obtaining the N common voltages corresponding to the N common voltage collection points, where the N common voltage collection points are the N position points sequentially arranged along the power supply access end to the remote power supply end of the common electrode, and 1<N≤M; determining a common voltage corresponding to each row of sub-pixel units according to the N common voltages corresponding to the N common voltage collection points; determining a compensation gray-scale value of each sub-pixel unit according to the common voltage corresponding to each row of sub-pixel units; and compensating gray-scale data of a frame to-be-displayed according to the compensation gray-scale value of each sub-pixel unit, and outputting the compensated gray-scale data to the display panel to drive the display panel to display.

Optionally, the driving circuit includes the common voltage feedback line and the N common voltage detection units electrically connected to the N common voltage collection points of the common electrode in one-to-one correspondence. Each common voltage detection unit includes the switch module and the logic circuit, the switch module includes the first connection end, the second connection end, and the control end, the first connection end is electrically connected to the common voltage collection point corresponding to the common voltage detection unit, the second connection end is electrically connected to the common voltage feedback line, and the logic circuit is electrically connected to the control end of the switch module. Before obtaining the N common voltages corresponding to the N common voltage collection points, the driving method further includes: outputting the control signals to the corresponding switch modules sequentially through the N logic circuits, and controlling the N switch modules included in the N common voltage detection units to sequentially turn on, to make the N common voltage collection points sequentially feed back the common voltages to the common voltage feedback line through the turned-on switch modules, to sequentially output the N common voltages corresponding to the N common voltage collection points through the common voltage feedback line. Obtaining the N common voltages corresponding to the N common voltage collection points includes: obtaining the N common voltages corresponding to the N common voltage collection points sequentially output from the common voltage feedback line.

Optionally, determining the compensation gray-scale value of each sub-pixel unit according to the common voltage corresponding to each row of sub-pixel units includes: determining the compensation gray-scale value of each sub-pixel unit according to a first preset compensation gray-scale mapping table and a voltage difference between the common voltage corresponding to each row of sub-pixel units and a target common voltage, where the first preset compensation gray-scale mapping table records a mapping relationship between multiple voltage differences and multiple compensation gray-scale values.

Optionally, determining the compensation gray-scale value of each sub-pixel unit according to the common voltage corresponding to each row of sub-pixel units includes: determining the compensation gray-scale value of each sub-pixel unit according to a second preset compensation gray-scale mapping table, a voltage difference between the common voltage corresponding to each row of sub-pixel units and a target common voltage, and the gray-scale data of the frame to-be-displayed, and the gray-scale data of the frame to-be-displayed includes a target gray-scale value corresponding to each sub-pixel unit, where the second preset compensation gray-scale mapping table records a mapping relationship between multiple voltage differences and multiple compensation gray-scale values under each target gray-scale value.

Although embodiments of the disclosure have been shown and described, it will be understood by those of ordinary skill in the art that various changes, modifications, substitutions, and modifications may be made to these embodiments without departing from the principles and purposes of the disclosure, and the scope of the disclosure is defined by the claims and their equivalents.

What is claimed is:

1. A driving circuit for a display panel, the display panel comprising a common electrode and the driving circuit comprising:

a common voltage feedback line; and

N common voltage detection units electrically connected to N common voltage collection points of the common electrode in a one-to-one correspondence, wherein the N common voltage collection points are N position points sequentially arranged along a power supply access end of the common electrode to a remote power supply end, and wherein N is a positive integer and N >1, wherein a common voltage detection unit comprises:

a switch module comprising a first connection end, a second connection end, and a control end, wherein the first connection end is electrically connected to a common voltage collection point corresponding to the common voltage detection unit, and the second connection end is electrically connected to the common voltage feedback line; and a logic circuit electrically connected to the control end of the switch module, wherein N logic circuits respectively comprised in the N common voltage detection units sequentially output control signals to corresponding switch modules, and control N switch modules respectively comprised in the N common voltage detection units to be sequentially turned on, to make the N common voltage collection points sequentially feed back common voltages to the common voltage feedback line through the turned-on N switch modules, to sequentially output N common voltages corresponding to the N common voltage collection points through the common voltage feedback line.

2. The driving circuit for the display panel of claim 1, wherein the driving circuit further comprises a timing controller electrically connected to the common voltage feedback line and the display panel, and wherein the timing controller is used to obtain the N common voltages corresponding to the N common voltage collection points output from the common voltage feedback line, compensate gray-scale data of a frame to be displayed according to the N common voltages corresponding to the N common voltage collection points, and output the compensated gray-scale data to the display panel to drive the display panel to display.

3. The driving circuit for the display panel of claim 2, wherein the N logic circuits are cascaded, and each logic circuit comprises an energy storage module, a trigger module, and a control signal output module, and wherein the trigger module and the control signal output module each comprise a first connection end, a second connection end, and a control end, and the energy storage module comprises a first end and a second end, wherein the first end of the energy storage module is electrically connected to the second connection end of the trigger module and the control end of the control signal output module respectively, and the second end of the energy storage module is electrically connected to the second connection end of the control signal output module;

the first connection end of the trigger module is electrically connected to the control end of the trigger module, and the control end of the trigger module is used to receive a trigger signal; and the first connection end of the control signal output module is electrically connected to the timing controller, the first connection end of the control signal output module is used to receive a clock signal provided by the timing controller, and the second connection end of the control signal output module is electrically connected to the control end of the switch module corresponding to the logic circuit, wherein the trigger module is turned on in response to the trigger signal, to charge the energy storage module, to change a potential of the control end of the control signal output module to a first level, the control signal output module is used to output the control signal to the corresponding switch module through the second connection end when the potential of the control end and the clock signal are both at the first level, a trigger signal received by a first connection end of a trigger module in a first logic circuit is a feedback start signal output by the timing controller, a trigger signal received by a first connection end of a trigger module in a y-th logic circuit of the N logic circuits is a control signal output by a (y−1)-th logic circuit, and y is a positive integer and N≥y≥2.

4. The driving circuit for the display panel of claim 3, wherein the (y−1)-th logic circuit of the N logic circuits further comprises:

a first reset module comprising a first connection end, a second connection end, and a control end, wherein the first connection end of the first reset module is electrically connected to a control end of a control signal output module in the (y−1)-th logic circuit, the second connection end of the first reset module is used to receive a second level, and the control end of the first reset module is electrically connected to a second connection end of a control signal output module in the y-th logic circuit, and the first reset module is turned on when receiving a control signal output by the y-th logic circuit, to reset a potential of the control end of the control signal output module in the (y−1)-th logic circuit to the second level, to turn off the control signal output module in the (y−1)-th logic circuit; and a second reset module comprising a first connection end, a second connection end, and a control end, wherein the first connection end of the second reset module is electrically connected to a second connection end of the control signal output module in the (y−1)-th logic circuit, the second connection end of the second reset module is used to receive the second level, and the control end of the second reset module is electrically connected to the second connection end of the control signal output module in the y-th logic circuit, and the second reset module is turned on when receiving the control signal output by the y-th logic circuit, to reset a potential of the second connection end of the control signal output module in the (y−1)-th logic circuit to the second level, to stop the (y−1)-th logic circuit from outputting the control signal.

5. The driving circuit for the display panel of claim 2, wherein the display panel further comprises M rows of sub-pixel units, M is a positive integer and M>N, and two adjacent common voltage collection points are spaced apart by at least one row of sub-pixel units, wherein the timing controller is used to determine a common voltage corresponding to each row of sub-pixel units according to the N common voltages corresponding to the N common voltage collection points, determine a compensation gray-scale value of each sub-pixel unit according to the common voltage corresponding to each row of sub-pixel units, and compensate the gray-scale data of the frame to be displayed according to the compensation gray-scale value of each sub-pixel unit, to obtain the compensated gray-scale data.

6. The driving circuit for the display panel of claim 5, wherein the timing controller is used to determine the compensation gray-scale value of each sub-pixel unit according to a first preset compensation gray-scale mapping table and a voltage difference between the common voltage corresponding to each row of sub-pixel units and a target common voltage; and wherein the first preset compensation gray-scale mapping table records a mapping relationship between a plurality of voltage differences and a plurality of compensation gray-scale values.

7. The driving circuit for the display panel of claim 5, wherein the timing controller is used to determine the compensation gray-scale value of each sub-pixel unit according to a second preset compensation gray-scale mapping table, a voltage difference between the common voltage corresponding to each row of sub-pixel units and a target common voltage, and the gray-scale data of the frame to be displayed, and the gray-scale data of the frame to be displayed comprises a target gray-scale value corresponding to each sub-pixel unit; and wherein the second preset compensation gray-scale mapping table records a mapping relationship between a plurality of voltage differences and a plurality of compensation gray-scale values under each target gray-scale value.

8. A display device, comprising a housing, a power supply module, a display panel, and a driving circuit for the display panel, the display panel comprising a common electrode and the driving circuit comprising:

a common voltage feedback line; and

N common voltage detection units electrically connected to N common voltage collection points of the common electrode in a one-to-one correspondence, wherein the N common voltage collection points are N position points sequentially arranged along a power supply access end of the common electrode to a remote power supply end, and wherein N is a positive integer and N>1, wherein a common voltage detection unit comprises:

a switch module comprising a first connection end, a second connection end, and a control end, wherein the first connection end is electrically connected to a common voltage collection point corresponding to the common voltage detection unit, and the second connection end is electrically connected to the common voltage feedback line; and a logic circuit electrically connected to the control end of the switch module, wherein N logic circuits respectively comprised in the N common voltage detection units sequentially output control signals to corresponding switch modules, and control N switch modules respectively comprised in the N common voltage detection units to be sequentially turned on, to make the N common voltage collection points sequentially feed back common voltages to the common voltage feedback line through the turned-on N switch modules, to sequentially output N common voltages corresponding to the N common voltage collection points through the common voltage feedback line; and the driving circuit is electrically connected to the display panel and the power supply module, the power supply module is used to provide a working power supply for the driving circuit, the driving circuit is used to drive the display panel to display, and the housing is used to fix contain the power supply module, the display panel, and the driving circuit.

9. The display device of claim 8, wherein the driving circuit further comprises a timing controller electrically connected to the common voltage feedback line and the display panel, and wherein the timing controller is used to obtain the N common voltages corresponding to the N common voltage collection points output from the common voltage feedback line, compensate gray-scale data of a frame to be displayed according to the N common voltages corresponding to the N common voltage collection points, and output the compensated gray-scale data to the display panel to drive the display panel to display.

10. The display device of claim 9, wherein the N logic circuits are cascaded, and each logic circuit comprises an energy storage module, a trigger module, and a control signal output module, and wherein the trigger module and the control signal output module each comprise a first connection end, a second connection end, and a control end, and the energy storage module comprises a first end and a second end, wherein the first end of the energy storage module is electrically connected to the second connection end of the trigger module and the control end of the control signal output module respectively, and the second end of the energy storage module is electrically connected to the second connection end of the control signal output module;

the first connection end of the trigger module is electrically connected to the control end of the trigger module, and the control end of the trigger module is used to receive a trigger signal; and the first connection end of the control signal output module is electrically connected to the timing controller, the first connection end of the control signal output module is used to receive a clock signal provided by the timing controller, and the second connection end of the control signal output module is electrically connected to the control end of the switch module corresponding to the logic circuit, wherein the trigger module is turned on in response to the trigger signal, to charge the energy storage module, to change a potential of the control end of the control signal output module to a first level, the control signal output module is used to output the control signal to the corresponding switch module through the second connection end when the potential of the control end and the clock signal are both at the first level, a trigger signal received by a first connection end of a trigger module in a first logic circuit is a feedback start signal output by the timing controller, a trigger signal received by a first connection end of a trigger module in a y-th logic circuit of the N logic circuits is a control signal output by a (y−1)-th logic circuit, and y is a positive integer and N≥y≥2.

11. The display device of claim 10, wherein the (y−1)-th logic circuit of the N logic circuits further comprises:

a first reset module comprising a first connection end, a second connection end, and a control end, wherein the first connection end of the first reset module is electrically connected to a control end of a control signal output module in the (y−1)-th logic circuit, the second connection end of the first reset module is used to receive a second level, and the control end of the first reset module is electrically connected to a second connection end of a control signal output module in the y-th logic circuit, and the first reset module is turned on when receiving a control signal output by the y-th logic circuit, to reset a potential of the control end of the control signal output module in the (y−1)-th logic circuit to the second level, to turn off the control signal output module in the (y−1)-th logic circuit; and a second reset module comprising a first connection end, a second connection end, and a control end, wherein the first connection end of the second reset module is electrically connected to a second connection end of the control signal output module in the (y-1)-th logic circuit, the second connection end of the second reset module is used to receive the second level, and the control end of the second reset module is electrically connected to the second connection end of the control signal output module in the y-th logic circuit, and the second reset module is turned on when receiving the control signal output by the y-th logic circuit, to reset a potential of the second connection end of the control signal output module in the (y−1)-th logic circuit to the second level, to stop the (y-1)-th logic circuit from outputting the control signal.

12. The display device of claim 9, wherein the display panel further comprises M rows of sub-pixel units, M is a positive integer and M>N, and two adjacent common voltage collection points are spaced apart by at least one row of sub-pixel units, wherein the timing controller is used to determine a common voltage corresponding to each row of sub-pixel units according to the N common voltages corresponding to the N common voltage collection points, determine a compensation gray-scale value of each sub-pixel unit according to the common voltage corresponding to each row of sub-pixel units, and compensate the gray-scale data of the frame to be displayed according to the compensation gray-scale value of each sub-pixel unit, to obtain the compensated gray-scale data.

13. The display device of claim 12, wherein the timing controller is used to determine the compensation gray-scale value of each sub-pixel unit according to a first preset compensation gray-scale mapping table and a voltage difference between the common voltage corresponding to each row of sub-pixel units and a target common voltage; and wherein the first preset compensation gray-scale mapping table records a mapping relationship between a plurality of voltage differences and a plurality of compensation gray-scale values.

14. The display device of claim 12, wherein the timing controller is used to determine the compensation gray-scale value of each sub-pixel unit according to a second preset compensation gray-scale mapping table, a voltage difference between the common voltage corresponding to each row of sub-pixel units and a target common voltage, and the gray-scale data of the frame to be displayed, and the gray-scale data of the frame to be displayed comprises a target gray-scale value corresponding to each sub-pixel unit; and wherein the second preset compensation gray-scale mapping table records a mapping relationship between a plurality of voltage differences and a plurality of compensation gray-scale values under each target gray-scale value.

15. The display device of claim 8, wherein the power supply module is further electrically connected to the power supply access end of the common electrode of the display panel, and the power supply module is further used to input a common voltage to the common electrode of the display panel.

16. A driving method, applied to a driving circuit for a display panel, the display panel comprising a common electrode and M rows of sub-pixel units, wherein M is a positive integer, and the driving circuit comprising:

a common voltage feedback line; and

N common voltage detection units electrically connected to N common voltage collection points of the common electrode in a one-to-one correspondence, wherein the N common voltage collection points are N position points sequentially arranged along a power supply access end of the common electrode to a remote power supply end, and wherein N is a positive integer and N>1, wherein a common voltage detection unit comprises:

a switch module comprising a first connection end, a second connection end, and a control end, wherein the first connection end is electrically connected to a common voltage collection point corresponding to the common voltage detection unit, and the second connection end is electrically connected to the common voltage feedback line; and a logic circuit electrically connected to the control end of the switch module, wherein N logic circuits respectively comprised in the N common voltage detection units sequentially output control signals to corresponding switch modules, and control N switch modules respectively comprised in the N common voltage detection units to be sequentially turned on, to make the N common voltage collection points sequentially feed back common voltages to the common voltage feedback line through the turned-on N switch modules, to sequentially output N common voltages corresponding to the N common voltage collection points through the common voltage feedback line; and the driving method comprises:

obtaining the N common voltages corresponding to the N common voltage collection points, wherein the N common voltage collection points are the N position points sequentially arranged along the power supply access end to the remote power supply end of the common electrode, and 1<N≤M;

determining a common voltage corresponding to each of the M rows of sub-pixel units according to the N common voltages corresponding to the N common voltage collection points;

determining a compensation gray-scale value of each of a sub-pixel unit according to the common voltage corresponding to each of the M rows of sub-pixel units; and compensating gray-scale data of a frame to be displayed according to the compensation gray-scale value of each sub-pixel unit, and outputting the compensated gray-scale data to the display panel to drive the display panel to display.

17. The driving method of claim 16, before obtaining the N common voltages corresponding to the N common voltage collection points, the driving method further comprising:

outputting the control signals to the corresponding switch modules sequentially through the N logic circuits, and controlling the N switch modules comprised in the N common voltage detection units to be sequentially turned on, to make the N common voltage collection points sequentially feed back the common voltages to the common voltage feedback line through the turned-on switch modules, to sequentially output the N common voltages corresponding to the N common voltage collection points through the common voltage feedback line.

18. The driving method of claim 16, wherein obtaining the N common voltages corresponding to the N common voltage collection points comprises:

obtaining the N common voltages corresponding to the N common voltage collection points sequentially output from the common voltage feedback line.

19. The driving method of claim 16, wherein determining the compensation gray-scale value of each sub-pixel unit according to the common voltage corresponding to each row of sub-pixel units comprises:

determining the compensation gray-scale value of each sub-pixel unit according to a first preset compensation gray-scale mapping table and a voltage difference between the common voltage corresponding to each row of sub-pixel units and a target common voltage, wherein the first preset compensation gray-scale mapping table records a mapping relationship between a plurality of voltage differences and a plurality of compensation gray-scale values.

20. The driving method of claim 16, wherein determining the compensation gray-scale value of each sub-pixel unit according to the common voltage corresponding to each row of sub-pixel units comprises:

determining the compensation gray-scale value of each sub-pixel unit according to a second preset compensation gray-scale mapping table, a voltage difference between the common voltage corresponding to each row of sub-pixel units and a target common voltage, and the gray-scale data of the frame to be displayed, and the gray-scale data of the frame to be displayed comprises a target gray-scale value corresponding to each sub-pixel unit, wherein the second preset compensation gray-scale mapping table records a mapping relationship between a plurality of voltage differences and a plurality of compensation gray-scale values under each target gray-scale value.

* * * * *